(12) United States Patent
Lefevre et al.

(10) Patent No.: US 6,528,069 B1
(45) Date of Patent: Mar. 4, 2003

(54) CONCENTRATED POLYOL COMPOSITION

(75) Inventors: Philippe Lefevre, Merville (FR);
Xavier Duriez, Saint Jans Cappel (FR);
Scott L. Harris, Hamilton, IL (US);
Gina A. Steffensmeier, Salem, IA (US)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 09/450,168

(22) Filed: Nov. 29, 1999

(30) Foreign Application Priority Data

Nov. 27, 1998 (FR) .............................. 98 14962

(51) Int. Cl.$^7$ .............................. A61K 6/00; C07H 1/00; C13K 5/00; C08B 31/00
(52) U.S. Cl. ................ 424/401; 536/1.11; 536/102; 536/104; 536/123.1; 536/123.13
(58) Field of Search ................ 424/401; 536/1.11, 536/102, 104, 123.1, 123.13

(56) References Cited

U.S. PATENT DOCUMENTS

| 4,671,961 A | 6/1987 | Patel et al. |
| 4,671,967 A | 6/1987 | Patel et al. |
| 4,728,515 A | 3/1988 | Patel et al. |
| 4,883,537 A | 11/1989 | Burdick |
| 5,651,936 A | 7/1997 | Reed et al. |
| 5,728,225 A | 3/1998 | Duflot et al. |
| 5,773,604 A | 6/1998 | Lefevre et al. |

FOREIGN PATENT DOCUMENTS

| AU | 9066579 | 5/1991 |
| EP | 0 072 080 | 2/1983 |
| WO | WO 95/04107 | 2/1995 |
| WO | WO 97/48372 | 12/1997 |

*Primary Examiner*—Thurman K. Page
*Assistant Examiner*—Amy E Pulliam
(74) *Attorney, Agent, or Firm*—Sturm & Fix LLP

(57) ABSTRACT

A concentrated polyol composition, having a water content from 10–17%, preferably between 12 and 16%, and comprising from 35 to 90% of hydrogenated monosaccharides including at least 30% of sorbitol, and from 0 to 45% of hydrogenated disaccharides, these percentages being expressed as dry weight relative to the dry weight of all the hydrogenated saccharides contained in the said composition. This concentrated polyol composition may advantageously be unsweetened. This concentrated polyol composition may be used as a medium for dispersing hydrophilic polymers, and in particular cellulose, as well as for the preparation of pharmaceutical or cosmetological products such as toothpastes.

18 Claims, No Drawings

CONCENTRATED POLYOL COMPOSITION

The present invention relates to a concentrated polyol composition.

The invention also relates to its use for dispersing hydrocolloids such as cellulose and its derivatives, as well as for preparing pharmaceutical or cosmetological products, in particular such as toothpastes.

Toothpastes generally contain an abrasive agent, a wetting agent, water and a gelling agent used to impart a creamy or gel-type consistency and to form a support for all the other ingredients present in the toothpastes, such as flavourings, sweeteners and preserving agents.

The main function of the wetting agent is to maintain a certain level of humidity in the toothpaste when it is exposed to the open air, so as to prevent it from hardening and forming plugs in the orifice of the toothpaste tube.

The wetting agents usually used are glycerol and sorbitol as aqueous solutions, alone or as mixtures. Xylitol is sometimes used, but, since the process for producing it is more complex, it remains a more expensive product.

Consequently, for economic reasons, it is preferred to use sorbitol, which is found on the market in the form of syrups containing 70% solids.

In general, it is used in proportions from about 20 to about 70% of the weight of the toothpaste. It is moreover desirable for the sorbitol to be non-crystallizable, in order to ensure that it is stable before use and that the toothpastes are stable on storage.

As regards the gelling agents, hydrocolloids such as guar gum, guar derivatives, gum arabic, carrageenans, xanthans, methylcellulose, carboxymethylcellulose and hydroxyethylcellulose are generally used. They are used in proportions of from 0.1 to 5% by weight, depending on whether a paste or a gel is desired.

Sodium carboxymethylcellulose, more commonly referred to as CMC, is the gelling agent most commonly used in toothpastes.

During the preparation of toothpastes based on non-crystallizable sorbitol syrup containing 70% solids, the gelling agent is predispersed in the sorbitol syrup. This step is particularly critical since, although hydrophilic, the gelling agent has a tendency to form lumps and to aggregate. In certain cases, water penetrates these lumps very slowly and complete dispersion of the gelling agent is only reached after a considerable amount of time.

Certain manufacturers circumvent this problem by equipping themselves with very high shear mixers, but this equipment is very expensive.

Such is not the case when glycerol is selected as wetting agent, since the gelling agent disperses correctly in glycerol, which is anhydrous and thus does not solubilize it. Once water is added to the formulation, the gelling agent swells and disperses homogeneously to form a thick gel. This is the main advantage of glycerol over sorbitol.

However, many manufacturers are seeking to minimize their use of glycerol on account of its high and fluctuating cost, but also on account of its poor organoleptic performance.

However, as described above, there remains a problem to be solved for toothpaste formulators wishing to favour the use of sorbitol in replacement for glycerol.

One solution has been proposed in patent WO 97/48372 and consists in spraying polyol solutions onto hydrocolloid particles and then in drying the granules thus obtained on a fluidized bed. The polymer particles can then be incorporated into the toothpaste preparation without the formation of lumps. However, the fact remains that this additional step of preparation of the gelling agent further complicates the toothpaste formulation and is economically unacceptable.

Another solution, proposed in U.S. Pat. No. 4,883,537, consists in dispersing hydrocolloid in water, in the presence of an appreciable amount of potassium carbonate. It can easily be deduced that this solution is incompatible with use in toothpaste, on the one hand on account of the high alkalinity of potassium carbonate, and on the other hand on account of the supply of water imposed on the manufacturer.

To overcome the problems of aggregation of the gelling agents, it may be thought that it thus suffices to minimize the water content of the sorbitol syrups, since it is known, on the one hand, that when this water content is too high, lumps appear which are extremely difficult to remove, and, on the other hand, that when the water content of the dispersing medium is sufficiently low, there is no hydration or any anticipated swelling of the gelling agent, and thus no appearance of lumps.

However, the sorbitol syrups which are preferably used as wetting agents can exhibit concentration difficulties above a solids content of about 80%. This is because, when the water contained in such syrups is evaporated off, they become extremely viscous. Under these conditions, it is necessary to make use of sophisticated and thus expensive equipment. Furthermore, these very viscous products have the major drawback of no longer being pumpable, which makes them unsuitable for any industrial use, in particular with regard to the transportation, storage and processing of these syrups.

It has been proposed, in U.S. Pat. Nos. 3,651,936, 4,728,515, 4,671,961 and 4,671,967, to make use, for the preparation of food products such as chewing gums, of concentrated compositions based on coevaporated syrups of starch hydrolysates and of glycerol or of propylene glycol. The reason for this is that glycerol and propylene glycol lower the viscosity of starch hydrolysate syrups and make it easier to evaporate the water which these syrups contain. These concentrated compositions have a relatively low water content, for a glycerol content of at least 25% by weight. However, besides the drawback of its cost, glycerol by nature has an astringent and unpleasant taste which is generally detrimental to the organoleptic qualities of the final product. Similarly, patent WO 95/04107 has proposed dissolving polysaccharides in a mixture of sorbitol and glycerol. However, the presence of sorbitol in large proportions can entail risks of crystallization during storage. Furthermore, since the polysaccharide is present in small proportions (0.1%), this solution cannot be transposed to the preparation of toothpastes which generally contain from 1 to 5% gelling agent.

The aim of the invention is thus to overcome the drawbacks of the prior art and to provide a concentrated polyol composition containing sorbitol, which is better than the compositions which already exist in terms of the various practical requirements, i.e.:

which has a good capacity to disperse the gelling agents without forming lumps, and without necessarily using sophisticated equipment, which has Theological properties such that it is easy to handle and to transport, which is easy and economical to prepare, which can be used in pharmaceutical or cosmetic products, in particular in toothpastes, which is stable in itself and is capable of imparting sufficient stability on storage to the products into which it is incorporated, in particular with regard to the phenomena of crystallization during storage.

After detailed research, the Applicant has, to its merit, found that this aim can be achieved when the concentrated polyol composition has a selected water content and a specific carbohydrate profile.

Indeed, the Applicant has observed, surprisingly and unexpectedly, that a new phenomenon occurs, at high solids contents, during the dispersion of the gelling agents: in a first stage, the gelling agent disperses easily as expected, but, in a second stage, it absorbs the water present. This is equivalent to a substantial increase in the solids content of the medium, with, consequently, crystallization of the polyols, which is reflected in setting of the entire mixture to a solid.

Thus, unexpectedly, and as will moreover be demonstrated by examples, only a precise water content range in the polyol composition in fact makes it possible to disperse a gelling agent appropriately.

Above 17% water in the said composition, the gelling agent forms lumps in the preparation, and below 10% water, rapid setting of the mixture to a solid is observed after the gelling agent is added.

Advantageously, the water content should be between 12 and 16% in order to best avoid the problems mentioned above.

It was already known practice, in patent AU 642,177 of which the Applicant is the proprietor, to concentrate maltitol and xylitol syrups to water contents of 7 to 10%. However, the high content of hydrogenated disaccharides in these syrups, which are intended for food use, entails a high syrup viscosity. Moreover, these syrups contain virtually no sorbitol and do not necessarily satisfy the economic and functional requirements of manufacturers of pharmaceutical or cosmetological preparations, and in particular toothpaste manufacturers.

Other concentrated maltitol syrups have also been described in patent EP 0,072,080 for the preparation of gels, using very small amounts of carboxymethylcellulose.

These syrups, which are very rich in molecules with a degree of polymerization of 2 or more, are very viscous. Indeed, it is known that the viscosity is correlated with the molecular weight of the polyols contained in these syrups.

Viscous xylitol compositions are also known, which are described in U.S. Pat. No. 5,728,225, of which the Applicant is also the proprietor. These sorbitol-free compositions are of unsuitable viscosity.

Thus, the problem which is posed, in order to concentrate sorbitol syrups, relates to the stability and pumpability of the resulting compositions, the solids content of which is adjusted for satisfactory dispersibility of the gelling agents, these three criteria having never been combined in the prior art.

The Applicant has thus demonstrated that the stability and pumpability criteria can be satisfied when the polyol compositions, with a solids content which is adjusted for the dispersibility criterion, has a very specific carbohydrate profile.

The invention thus relates, firstly, to a concentrated polyol composition, characterized in that its water content is from 10 to 17%, preferably between 12 and 16%, and in that it comprises:
from 35 to 90% of hydrogenated monosaccharides including at least 30% of sorbitol,
from 0 to 45% of hydrogenated disaccharides, these percentages being expressed as dry weight relative to the dry weight of all of the saccharides contained in the said composition.

Preferably, this composition has a hydrogenated monosaccharides content of between 40 and 90% including at least 35% of sorbitol, and a hydrogenated disaccharides content of between 0 and 35%.

Even more preferably, it has a hydrogenated monosaccharides content of between 60 and 90% including at least 50% of sorbitol, and a hydrogenated disaccharides content of between 2 and 35%.

In point of fact, the Applicant has demonstrated, in the course of lengthy research studies, that by selecting this specific range of water contents, combined with this specific carbohydrate profile, polyol compositions according to the invention which are entirely suitable for the easy dispersion of hydrocolloids are obtained.

For the purposes of the present invention, the term "hydrogenated monosaccharide" is intended to refer to a product preferably chosen from the group comprising sorbitol, mannitol, xylitol, arabitol, iditol and ribitol, and mixtures thereof.

Preferably, the hydrogenated monosaccharide is chosen from sorbitol and mannitol and any mixtures thereof.

The term "hydrogenated disaccharide" is intended to refer to a product preferably chosen from the group comprising maltitol, lactitol, glucosido-1,6-mannitol, isomaltitol and cellobiitol, and any mixtures thereof.

Preferably, the hydrogenated disaccharide consists of maltitol. The composition according to the invention can also contain other hydrogenated saccharides such as, in particular, hydrogenated oligo- and polysaccharides. In particular, contents of from 10 to 19% by weight of polysaccharides whose degree of polymerization is greater than or equal to 3 are entirely suitable.

Besides the hydrogenated saccharides as described, this composition can also comprise conventional additives for pharmaceutical or cosmetic products, such as, for example, polishing materials, thickeners, surfactants, fluoro compounds, flavourings, sweeteners, dyes, bleaching agents, preserving agents or silicones.

According to an advantageous embodiment of the composition in accordance with the invention, it has a viscosity, measured at 45° C., of less than 10,000 mPa·s, preferably less than 5000 mPa·s and even more preferably between 500 and 4500 mPa·s.

The reason for this is that only those compositions with such viscosities can generally be considered as pumpable, without any problem of overheating of the industrial pumps.

As regards measuring the viscosity, this is carried out using an Ares-type rheometer sold by the company Rheometric Scientific (US).

This rheometer is equipped with a cone-plate type measuring system and a thermostatic system.

The test solutions are deposited on a thermostatically-regulated movable plate. The shear resistance of the product between the cone and the rotating plate is measured at a given temperature.

The results are expressed in mPa·s.

It is important to express the viscosity each time as a function of the temperature at which it was measured, given that it is directly dependent thereon.

According to another variant, the composition in accordance with the invention is at a temperature above dispersion of gelling agents, but it is also particularly advantageous for toothpaste users and, especially, manufacturers who carry out their preparations under hot conditions. The reason for this is that the delivery of a hot polyol composition enables the users to dispense with an additional heating step.

Thus, the composition in accordance with the invention, at a temperature of between 30 and 55° C., is particularly advantageous.

To prepare the composition in accordance with the invention, a syrup can be prepared from specific polyols in the state of powder or liquids or specific saccharide compositions can be hydrogenated, followed by evaporation of the water contained in the compositions thus prepared until a water content of between 10 and 17% by weight is reached. This evaporation step can be carried out using conventional devices, among which mention may be made of those sold under the brand name "Paravap" by the company APV Equipment Incorporated of Tonowanda N.Y.

A composition in accordance with the invention which also has a very low reducing-sugar content can be prepared, this composition being stable to alkalis, which will allow it to be used in particular in toothpastes containing basic compounds.

This composition, commonly classed as "unsweetened" by those skilled in the art, has a reducing-sugar content generally of less than 1000 ppm and preferably less than 500 ppm.

According to another embodiment, the composition in accordance with the invention can contain glycerol in small proportions, i.e. not more than 24% by weight of the said composition, so as to further improve the fluidity of the composition, if necessary. Glycerol contents of about 5 to 10% by weight may be suitable.

Next, to disperse the hydrocolloids, in particular such as cellulose and its derivatives, a general, novel and inventive means is now available, consisting of concentrated, selected polyol compositions as described above.

These compositions can thus be used easily in the preparation of toothpastes, and in many pharmaceutical or cosmetic preparations such as syrups, gels, creams and mouthwashes. They can also be used in various chemical or agrochemical industries.

The compositions in accordance with the invention have other advantages in the industrial sector, namely reducing the transportation costs by reducing the amount of water to be transported, reducing the volumes to be stored, and reducing the risks of microbial contamination.

The implementation time is also reduced, on account of the optimization of the debubbling operations associated with a reduced presence of water, as well as by improving the dispersion time of the hydrocolloids of lower viscosity.

The invention will be understood more clearly with the aid of the examples which follow, which are not intended to be limiting but merely give an account of certain embodiments and of certain advantageous properties of the compositions in accordance with the invention.

EXAMPLE 1

Test of Dispersion of a Gelling Agent

A polyol composition with the carbohydrate profile below is prepared:
  hydrogenated monosaccharides=41.3%/solids including sorbitol=38.8%
  hydrogenated disaccharides=32%/solids The solids content of this composition is 74.2% by weight. This composition is concentrated to different solids contents: 82%, 85%, 86.7%, 91%, 92%.

200 g of the polyol composition to be tested, taken from an oven at 45° C., are placed in a jacketed stainless-steel bowl heated to 45° C. by a bath with circulation.

8 g of CMC, sold under the trade name Blanose® 7MXF by the company Hercules, are added with stirring at 200 rpm. The mixture is left stirring for 20 minutes.

200 g of water are added and the mixture is stirred for a further 20 minutes at 200 rpm.

The texture of the mixture is observed.

Results:

| Water content of the compositions | Observations |
| --- | --- |
| 25.8% | Presence of lumps |
| 18% | Presence of lumps |
| 15% | Good dispersion |
| | No lumps |
| | Homogeneous gel produced after stirring for 40 min |
| 13.3% | Good dispersion |
| | No lumps |
| | Homogeneous gel produced after stirring for 40 min |
| 9% | Rapid setting to a solid after adding the CMC |

By analogy with glycerol, it might be assumed that the reduction in the water content of the compositions would make the CMC easier to disperse and that the most anhydrous products would be the best. However, this is not the case since a second phenomenon appears, unexpectedly, i.e. that for water contents of less than 10%, correct dispersion of the CMC is indeed observed in a first stage, followed almost instantaneously by setting of the solution to a solid.

The polyol syrups should thus be concentrated to contents selected between 10 and 17% of water, in order to ensure good dispersibility of the hydrocolloid.

EXAMPLE 2

Stability and Viscosity of a Composition According to the Invention

A polyol composition with an initial solids content of 70% was concentrated to different solids contents. The carbohydrate profile of the composition is as follows:
  Sorbitol: 83% (percentages expressed as weight/dry weight)
  Mannitol: 1.2%
  Maltitol: 4.2%

The following were carried out on each composition obtained:
  a study of the stability at 45° C. for 1 month
  a measurement of viscosity at 45° C.

The stability study consists in checking whether or not the compositions, stored at 45° C. for 1 month, have crystallized. The viscosities of the various compositions were measured using an Ares-type rheometer, sold by the company Rheometric Scientific (US).

The following results are obtained:

| Water content (% by weight) | Viscosity at 45° C. (mPa · s) | Stability at 45° C. over 1 month |
| --- | --- | --- |
| 30 | 45 | no crystallization |
| 19 | 395 | no crystallization |
| 18 | 490 | no crystallization |
| 14.5 | 980 | no crystallization |
| 10 | 392 | crystallizes after 2 weeks |

For all the compositions, the viscosities at 45° C. are relatively low: the products are pumpable at all the solids contents tested (viscosity less than 10,000 mPa·s).

The compositions are stable for 1 month at 45° C. for water contents of greater than 10%. These compositions have a high content of sorbitol (82.4% by weight/dry weight) which promotes the crystallization: this content is thus unfavorable for the test. In order to increase the stability at lower water contents, it was envisaged to significantly increase the content of hydrogenated disaccharides.

For comparative purposes, the viscosity at different temperatures is measured for a non-crystallizable maltitol-rich syrup sold by the Applicant under the trade name Lycasin® 80/55, concentrated to 85% solids, the carbohydrate profile of which is as follows:

hydrogenated monosaccharides: 8%/solids hydrogenated disaccharides: 55%/solids oligo- and polysaccharides: 37%/solids

| Temperature | Viscosity (mPa · s) |
| --- | --- |
| 30° C. | 250,000 |
| 40° C. | 70,000 |
| 50° C. | 23,000 |
| 60° C. | 8,000 |

These data show that the maltitol-rich syrups are not pumpable when they are concentrated to a high solids content, unless they are heated to 60° C. or more.

EXAMPLE 3

A composition in accordance with the invention is prepared by concentrating a sorbitol syrup to 14.5% of water, this syrup having the same carbohydrate spectrum as that of Example 2, initially at 30% water.

The viscosity, the stability of the composition and the dispersibility of the CMC in the composition at 45° C. are measured, according to the techniques described above.

Viscosity of the composition: 980 mPa·s

Stability at 45° C. over 1 month: no crystallization

Dispersion of the CMC: no lumps. Considerable thickening after adding the CMC.

The composition according to the invention which is tested here, which comprises 84.2% by weight/ hydrogenated monosaccharide solids, 4.2% by weight/ hydrogenated disaccharide solids and 14.5% by weight of water, is thus simultaneously stable, pumpable and allows the CMC to be dispersed, which were not possible with:

a non-concentrated sorbitol syrup of the prior art, a sorbitol syrup of the same carbohydrate spectrum, but concentrated to a water content of greater than 17% or less than 10%, a polyol syrup with a water content of between 10 and 17%, but with a different carbohydrate profile, i.e. containing more than 35% of hydrogenated disaccharides and/or less than 30% of sorbitol.

Only the compositions specifically selected by the Applicant fully satisfy all of the requirements of industrial practice.

Furthermore, they can be delivered at 45° C. and used directly at a temperature by manufacturers of pharmaceutical or cosmetic products who are interested in this use of compositions under hot conditions.

EXAMPLE 4

A polyol composition in accordance with the invention is prepared, the carbohydrate profile of which is as fallows:

| Sorbitol | 63.2% |
| --- | --- |
| Mannitol | 3.8% |
| Hydrogenated disaccharides | 22.3% |
| Hydrogenated polysaccharides (DP3 and +) | 10.5% |

6% by weight of glycerol is added to the composition.

The material and the composition is brought to 90° C.

The stability of the composition and the dispersibility of the CMC in this composition are evaluated in accordance with the examples above.

This composition is non-crystallizable.

It shows good dispersion of the CMC.

The viscosities at different temperatures are measured according to the method described above and show the pumpability of the composition at and above 45° C.

| 40° C. | 14,400 mPa · s |
| --- | --- |
| 45° C. | 9560 mPa · s |
| 50° C. | 4720 mPa · s |
| 60° C. | 1760 mPa · s |

EXAMPLE 5

Preparation of Toothpaste Pastes

A toothpaste A based on a sorbitol syrup in accordance with the invention, containing 85% solids, is prepared and is compared with a toothpaste B prepared with a sorbitol syrup of the prior art.

| Formula: | A | B |
| --- | --- | --- |
| Sorbitol syrup containing 70% solids |  | 64% |
| Sorbitol syrup containing 85.8% solids | 52.2% |  |
| Tixosil 73 abrasive silica | 14% | 14% |
| Tixosil 43 thickening silica | 9% | 9% |
| Texapon at 30% solids | 4.16% | 4.16% |
| CMC: Blanose 7MXF | 0.7% | 0.7% |
| Sodium saccharinate | 0.2% | 0.2% |
| Sodium monofluorophosphate | 0.76% | 0.76% |
| Silesia mint flavouring | 0.8% | 0.8% |
| Green colouring (1% solution) | 1% | 1% |
| Methyl paraben | 0.18% | 0.18% |
| Propyl paraben | 0.02% | 0.02% |
| Water | 16.98% | 5.18% |

Protocol:

Paste A: The water is heated to 65° C. in a beaker and the parabens are dissolved. The solution is cooled to 50° C. and the saccharinate and monofluorophosphate are then dissolved. A solution A1 is obtained.

The sorbitol syrup according to the invention is introduced into a mixer under vacuum, fitted with a single paddle at the bottom of the tank, of Guedu brand, type 4.5NO, (sold by the company Guedu, 21140 Semur-en-Auxois), with stirring at 470 rpm. The CMC is incorporated with mixing for 5 minutes. A solution A2 is obtained.

Solution A1 is then introduced into A2 with mixing for 5 minutes, after which the mixture is left to stand for 30 minutes while allowing the mixer to cool.

The dye and the flavouring are then added, with mixing for 5 minutes under vacuum.

Half of the silicas are added, with mixing for 10 minutes under vacuum.

The second half of the silicas are added, with mixing for 10 minutes under vacuum.

Finally, the Texapon is added, followed by mixing for 2 minutes 30 seconds under vacuum.

Paste B: The water is heated to 50° C. in a beaker and the saccharinate and monofluorophosphate are dissolved to give a solution B1.

The sorbitol syrup according to the prior art is heated to 80° C. and the parabens are dissolved.

The solution is cooled to 50° C. and the CMC is added very slowly with vigorous stirring, in a Polytron homogenizer (sold by the Swiss company Kinematica) set at 12,000 rpm. A solution B2 is obtained.

Solution B1 is added to B2 with mixing for 5 minutes, and this solution is then introduced into a Guedu mixer and left to stand for 30 minutes.

The protocol for adding the flavouring and the silicas is then the same as for paste A.

Results: The paste prepared with the composition according to the invention is entirely satisfactory. It appears shinier than the paste prepared with the standard syrup.

The Helipath viscosity after manufacture is 460,000 cps at 40° C.

The Helipath viscosity 24 hours after manufacture is 450,000 cps at 20° C.

The refractive index is similar for the two pastes:
A=1.4462
B=1.4457

It should furthermore be noted that the use of the composition according to the invention advantageously allows a larger amount of free water to be made available to dissolve the active agents.

Similarly, a toothpaste is prepared in which the formula differs only as regards the silicas, which are replaced with calcium carbonate.

The sorbitol syrup of the prior art is a sorbitol syrup which is stable to alkaline agents, sold by the Applicant under the brand name Neosorb® 70/70SB. This syrup is concentrated to 85.8% solids in accordance with the invention.

The formula of the paste is as follows:

|  | A | B |
|---|---|---|
| Neosorb ® 70/70 SB containing 70% solids | 35.7% |  |
| Neosorb ® 70/70 SB containing 85.8% solids |  | 29.10% |
| Calcium carbonate | 45% | 45% |
| Texapon containing 30% solids | 5.66% | 5.66% |
| Blanose 7MXF | 1.15% | 1.15% |
| Sodium saccharinate | 0.2% | 0.2% |
| Sodium monofluorophosphate | 0.8% | 0.8% |
| Silesia mint flavouring | 1% | 1% |
| Methyl paraben | 0.18% | 0.18% |
| Propyl paraben | 0.02% | 0.02% |
| Water | 16.89% | 10.29% |

The protocol is identical to that for the above pastes.

The results are also very satisfactory. The Helipath viscosity of the paste according to the invention, after manufacture, is 340,000 cps at 42° C., and 600,000 cps at 20° C. after 12 hours of manufacture.

Similarly, the amount of free water available increases when the composition according to the invention is used.

EXAMPLE 6

Study of stability at 45° C.

The stability in terms of colour and composition is studied for a composition in accordance with the invention stored at 45° C.

To this effect, a temperature-stable and alkali-stable sorbitol syrup, sold by the Applicant under the brand name Neosorb® 70/70 SB, is prepared and brought to 85% solids on a finisher.

This syrup is stored for 4 months in a heated container, at a temperature of about 45° C.

During this storage, no change was observed visually: no appearance of crystals, no yellowish coloration.

Samples of this syrup were taken at 15 days, 1 month, 2 months and 4 months of storage for comparative analysis.

The results are as follows:

| Duration of storage | 0 | 15 days | 1 month | 2 months | 4 months |
|---|---|---|---|---|---|
| Refractive index | 1.4940 | 1.4946 | 1.4944 | 1.4946 | 1.4940 |
| Solids | 85.4% | 85.5% | 85.5% | 85.7% | 85.3% |
| Reducing sugars (ppm/solids) | 180 ppm | 250 ppm | 150 ppm | 210 ppm | 180 ppm |
| pH | 6.0 | 5.6 | 5.7 | 6.0 | 5.4 |
| Icumsa coloration | 5 |  | 5 |  | 5 |

The composition according to the invention did not change during the 4 months of storage at 45° C.; it appears to be very stable at this temperature.

It is thus entirely possible to envisage storing and delivering this composition at this temperature.

What is claimed is:

1. A concentrated polyol composition suitable for the easy dispersion of hydrocolloid agents selected from the group consisting of guar gum, guar derivatives, gum arabic, xanthans, methylcellulose, carboxymethyl-cellulose and hydroxycellulose, said composition having a water content from 10 to 17% and comprising:

from 35 to 90% of hydrogenated monosaccharides which includes at least 30% of sorbitol, from 0 to 45% of hydrogenated disaccharides, the complement to 100% being constituted by hydrogenated oligo- and polysaccharides, these percentages being expressed as dry weight relative to the dry weight of the composition.

2. The concentrated polyol composition according to claim 1, wherein its content of hydrogenated monosaccharides is between 40 and 90%, including at least 35% of sorbitol, and its content of hydrogenated disaccharides is between 0 and 35%.

3. The concentrated polyol composition according to claim 2, wherein its content of hydrogenated monosaccharides is between 60 and 90%, including at least 50% of sorbitol, and its content of hydrogenated disaccharides is between 2 and 35%.

4. The concentrated polyol composition according to claim 1, having a reducing-sugar content of less than 500 ppm of solids.

5. The concentrated polyol composition according to claim 1, comprising also 10 to 19% by weight of hydrogenated polysaccharides with degree of polymerization of greater than or aqual to 3.

6. The concentrated polyol composition according to claim 1, comprising also glycerol in an amount of less than or equal to 24% by weight relative to the weight of the said composition.

7. A process for the manufacture of a dispersed colloid comprising the steps consisting in:
- selecting at least one hydrocolloid selected in the group consisting of guar gum, guar derivatives, gum arabic, xanthans, methylcellulose, carboxymethyl-cellulose and hydroxycellulose,
- selecting a polyol composition comprising from 35 to 90% of hydrogenated monosaccharides including at least 30% of sorbitol, from 0 to 45% of hydrogenated disaccharides, the complement to 100% being constituted by hydrogenated oligo- and polysaccharides,
    - these percentages being expressed as dry weight relative to the dry weight of the composition,
- concentrating the polyol composition to a water content ranging between 10 and 17%,
- dispersing the hydrocolloid(s) into said composition of polyols presenting a water content between 10 and 17%.

8. The process according to claim 7, wherein the concentrated polyol composition presents a content of hydrogenated monosaccharides between 40 and 90%, including at least 35% of sorbitol, and a content of hydrogenated disaccharides is between 0 and 35%.

9. The process according to claim 2, wherein the concentrated polyol composition presents a content of hydrogenated monosaccharides between 60 and 90%, including at least 50% of sorbitol, and a content of hydrogenated disaccharides between 2 and 35%.

10. The process according to claim 7, wherein the concentrated polyol composition has a reducing-sugar content of less than 500 ppm of solids.

11. The process according to claim 7, wherein the concentrated polyol composition also comprises 10 to 19% by weight of hydrogenated polysaccharides with degree of polymerization of greater than or equal to 3.

12. The process according to claim 7, wherein the concentrated polyol composition also comprises glycerol in an amount of less than or equal to 24% by weight relative to the weight of the said composition.

13. A process for the manufacture of a toothpaste comprising the steps consisting of:
- selecting at least one hydrocolloid selected from the group consisting of guar gum, guar derivatives, gum arabic, xanthans, methylcellulose, carboxymethyl-cellulose and hydroxycellulose,
- selecting a polyol composition comprising from 35 to 90% of hydrogenated monosaccharides including at least 30% of sorbitol, from 0 to 45% of hydrogenated disaccharides, the complement to 100% being constituted by hydrogenated oligo- and polysaccharides,
    - these percentages being expressed as dry weight relative to the dry weight of the composition,
- concentrating the polyol composition to a water content ranging between 10 and 17%,
- dispersing the hydrocelloid(s) into said composition of polyols presenting a water content between 10 and 17%
- adding conventional additives selected from the group consisting of polishing materials, thickeners, surfactants, fluoro compounds, flavourings, sweeteners, dyes, bleaching agents, preserving agents, silicones and mixtures thereof.

14. The process according to claim 13, wherein the concentrated polyol composition presents a content of hydrogenated monosaccharides between 40 and 90%, including at least 35% of sorbitol, and a content of hydrogenated disaccharides is between 0 and 35%.

15. The process according to claim 14, wherein the concentrated polyol composition presents a content of hydrogenated monosaccharides between 60 and 90%, including at least 50% of sorbitol, and a content of hydrogenated disaccharides between 2 and 35%.

16. The process according to claim 13 wherein the concentrated polyol composition has a reducing-sugar content of less than 500 ppm of solids.

17. The process according to claim 13 wherein the concentrated polyol composition also comprises 10 to 19% by weight of hydrogenated polysaccharides with degree of polymerization of greater than or equal to 3.

18. The process according to claim 13, wherein the concentrated polyol composition also comprises glycerol in an amount of less than or equal to 24% by weight relative to the weight of the said composition.

* * * * *